(12) United States Patent
Taoka et al.

(10) Patent No.: US 8,705,472 B2
(45) Date of Patent: Apr. 22, 2014

(54) COMMUNICATION CONTROL METHOD, MOBILE STATION APPARATUS, AND BASE STATION APPARATUS

(75) Inventors: Hidekazu Taoka, Chiyoda-ku (JP); Bijun Zhang, Chiyoda-ku (JP); Xiaoming She, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/261,456

(22) PCT Filed: Apr. 5, 2011

(86) PCT No.: PCT/JP2011/058571
§ 371 (c)(1),
(2), (4) Date: Jan. 22, 2013

(87) PCT Pub. No.: WO2011/125994
PCT Pub. Date: Oct. 13, 2011

(65) Prior Publication Data
US 2013/0114513 A1      May 9, 2013

(30) Foreign Application Priority Data

Apr. 5, 2010  (JP) ................................. 2010-087264

(51) Int. Cl.
*H04W 72/04* (2009.01)
*H04L 27/28* (2006.01)
*H04B 7/04* (2006.01)

(52) U.S. Cl.
CPC .............. *H04W 72/04* (2013.01); *H04L 27/28* (2013.01); *H04W 72/0413* (2013.01); *H04B 7/0417* (2013.01)

USPC .......... 370/329; 370/236.1; 370/235; 370/229

(58) Field of Classification Search
CPC .......... H04J 99/00; H04B 7/04; H04W 72/04; H04W 72/0413
See application file for complete search history.

(56) References Cited

U.S. PATENT DOCUMENTS

| | | | |
|---|---|---|---|
| 8,204,470 B2* | 6/2012 | Onggosanusi et al. ........ | 455/329 |
| 2010/0195594 A1* | 8/2010 | Seo et al. ....................... | 370/329 |
| 2011/0268204 A1* | 11/2011 | Choi et al. ..................... | 375/260 |
| 2012/0127948 A1* | 5/2012 | Chung et al. .................. | 370/329 |

OTHER PUBLICATIONS

Schwarz, S.; Wrulich, M.; Rupp, M., "Mutual information based calculation of the Precoding Matrix Indicator for 3GPP UMTS/LTE," Smart Antennas (WSA), 2010 International ITG Workshop on , vol., no., pp. 52,58, Feb. 23-24, 2010, doi: 10.1109/WSA.2010.5456388.*
Decision to Grant a Patent in corresponding Japanese application No. 2010-087264 dated Apr. 9, 2013 (4 pages).

(Continued)

*Primary Examiner* — Andrew Lai
*Assistant Examiner* — Hoyet H Andrews
(74) *Attorney, Agent, or Firm* — Osha Liang LLP

(57) ABSTRACT

In order to reduce the amount of feedback information for specifying a precoding weight, the mobile station apparatus generates a control signal for specifying the precoding weight using bits representing a rank indicator (RI) and bits representing a precoding matrix indicator (PMI) from a bit space, including a plurality of bits representing the RI and a plurality of bits representing the PMI, in which the same bits representing the RI are allocated to a plurality of ranks equal to or higher than a predetermined rank. The control signal is transmitted in uplink using the antennas.

6 Claims, 7 Drawing Sheets

(56) References Cited

OTHER PUBLICATIONS

International Search Report from PCT/JP2011/058571 mailed on Jun. 14, 2011 (1 page).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)", Dec. 2008 (18 pages).

* cited by examiner

COMMUNICATION CONTROL METHOD, MOBILE STATION APPARATUS, AND BASE STATION APPARATUS

TECHNICAL FIELD

The present invention relates to a communication control method, a mobile station apparatus, and a base station apparatus. More particularly, the present invention relates to a communication control method, a mobile station apparatus, and a base station apparatus employed in multiple antenna transmission.

BACKGROUND ART

In a universal mobile. telecommunications system (UMTS) network, high speed downlink packet access (HSDPA) or high speed uplink packet access (HSUPA) is employed in order to improve spectrum efficiency and a data rate so that characteristics of a wideband code division multiple access (W-CDMA) based system can be maximized. In such an UMTS network technology, long term evolution (LTE) has been discussed to obtain a higher data rate, a lower delay, and the like.

In a 3GPP system, a fixed band of 5 MHz is used in general to implement a transmission rate of 2 Mbps at maximum in downlink. Meanwhile, in an LTE system, transmission rates of 300 Mbps in downlink and 75 Mbps in uplink at maximum can be implemented using scalable carrier bandwidths between 1.4 MHz and 20 MHz. In addition, in a UMTS network, in order to obtain a wider bandwidth and a faster transmission rate, a post-LTE system is also discussed (e.g., LTE-Advanced (LTE-A)). For example, in LTE-A, it is anticipated that the maximum system bandwidth of 20 MHz in the LTE specification is expanded to, approximately, 100 MHz. In addition, it is anticipated that the maximum number of transmit antennas set to 4 in the LTE specification is expanded to 8.

In an LTE system, data are transmitted/received using a plurality of antennas, and a multiple input multiple output (MIMO) system has been proposed as a radio communication technique for improving a data rate (spectrum efficiency) (e.g., refer to 3GPP TR 25.913 "Requirements for Evolved UTRA and Evolved UTRAN"). In the MIMO system, a plurality of transmit/receive antennas are provided in a transceiver, and different transmission information sequences are simultaneously transmitted from different transmit antennas. Meanwhile, at the receiver side, the information sequences transmitted simultaneously are separately detected in consideration of a fact that different fading variations are generated between transmit/receive antennas, so that it is possible to increase a data rate (spectrum efficiency).

In an LTE system, there are defined single-user MIMO (SU-MIMO) in which overall transmission information sequences simultaneously transmitted from different transmit antennas belong to the same user and multiple-user MIMO (MU-MIMO) in which transmission information sequences simultaneously transmitted from different transmit antennas belong to different users. In both the SU-MIMO transmission and the MU-MIMO transmission, an optimal pre coding matrix indicator (PMI) is selected from a codebook in which a plurality of. phase/amplitude control amounts (precoding matrix (precoding weight)) to be set for the antennas of the transmitter at the receiver side and a plurality of PMIs corresponding to the precoding matrix are defined for each rank, and the optimal PMI is fed back to the transmitter. In addition, a rank indicator (RI) indicating the optimal rank is selected and fed back to the transmitter. At the transmitter side, the precoding weights for each transmit antenna are specified based on the PMI and the RI fed back from the receiver, and the precoding is performed, so that the transmission information sequences are transmitted.

CITATION LIST

Non-Patent Literature

[Non-patent Literature 1] 3GPP TR 25.913 "Requirements for Evolved UTRA and Evolved UTRAN"

SUMMARY OF THE INVENTION

Technical Problem

As described above, in LTE-A, it is anticipated that the maximum system bandwidth is expanded to, approximately, 100 MHz, and the maximum number of transmit antennas is expanded to 8. For this reason, it is anticipated that the number of supportable streams or the number of spatially multiplexed users increases, compared to the LTE system. In this manner, under circumstances where the number of supportable streams or the number of spatially multiplexed users increases, it is postulated that the amount of feedback information from the receiver used in the transmitter to specify the precoding weight increases.

The present invention has been made in view of the aforementioned problems, and an aim thereof is to provide a communication control method, a mobile station apparatus, and a base station apparatus capable of reducing the amount of feedback information for specifying the precoding weight.

Solution to Problem

According to an aspect of the present invention, there is provided a communication control method including: generating a control signal for specifying a precoding weight using bits representing a rank indicator (RI) and bits representing a precoding matrix indicator (PMI) from a bit space, including a plurality of bits representing the RI and a plurality of bits representing the PMI, in which the same bits representing the RI are allocated to a plurality of ranks equal to or higher than a predetermined rank; and transmitting the control signal in uplink.

In this method, the same bits representing the RI are allocated to a plurality of ranks equal to or higher than a predetermined rank from a bit space including a plurality of bits representing the RI and a plurality of bits representing the PMI. As a result, it is possible to reduce the number of bits representing the RI. Therefore, it is possible to reduce the amount of feedback information for specifying the precoding weight.

According to another aspect of the present invention, there is provided a mobile station apparatus including: a control signal generating means that generates a control signal for specifying a precoding weight using bits representing RI and bits representing PMI from a bit space, including a plurality of bits representing the RI and a plurality of bits representing the PMI, in which the same bits representing the RI are allocated to a plurality of ranks equal to or higher than a predetermined rank; and a transmit means that transmits the control signal in uplink.

In this configuration, the same bits representing the RI are allocated to a plurality of ranks equal to or higher than a predetermined rank from a bit space including a plurality of bits representing the RI and a plurality of bits representing the PMI. As a result, it is possible to reduce the number of bits representing the RI. Therefore, it is possible to reduce the amount of feedback information to the base station apparatus for specifying the precoding weight.

According to still another aspect of the present invention, there is provided a base station apparatus including: a receive means that receives a control signal for specifying a precoding weight using bits representing RI and bits representing PMI from a bit space, including a plurality of bits representing the RI and a plurality of bits representing the PMI, in which the same bits representing the RI are allocated to a plurality of ranks equal to or higher than a predetermined rank; and a weight generating means that generates a precoding weight based on the control signal.

In this configuration, the same bits representing the RI are allocated to a plurality of ranks equal to or higher than a predetermined rank from a bit space including a plurality of bits representing the RI and a plurality of bits representing the PMI. As a result, it is possible to reduce the number of bits representing the RI. Therefore, it is possible to reduce the amount of feedback information from the mobile station apparatus for specifying the precoding weight.

Technical Advantage of the Invention

According to the present invention, the same bits representing the RI are allocated to a plurality of ranks equal to or higher than a predetermined rank from a bit space including a plurality of bits representing the RI and a plurality of bits representing the PMI. As a result, it is possible to reduce the number of bits representing the RI. Therefore, it is possible to reduce the amount of feedback information for specifying the precoding weight.

DESCRIPTION OF EMBODIMENTS

Figure 1:
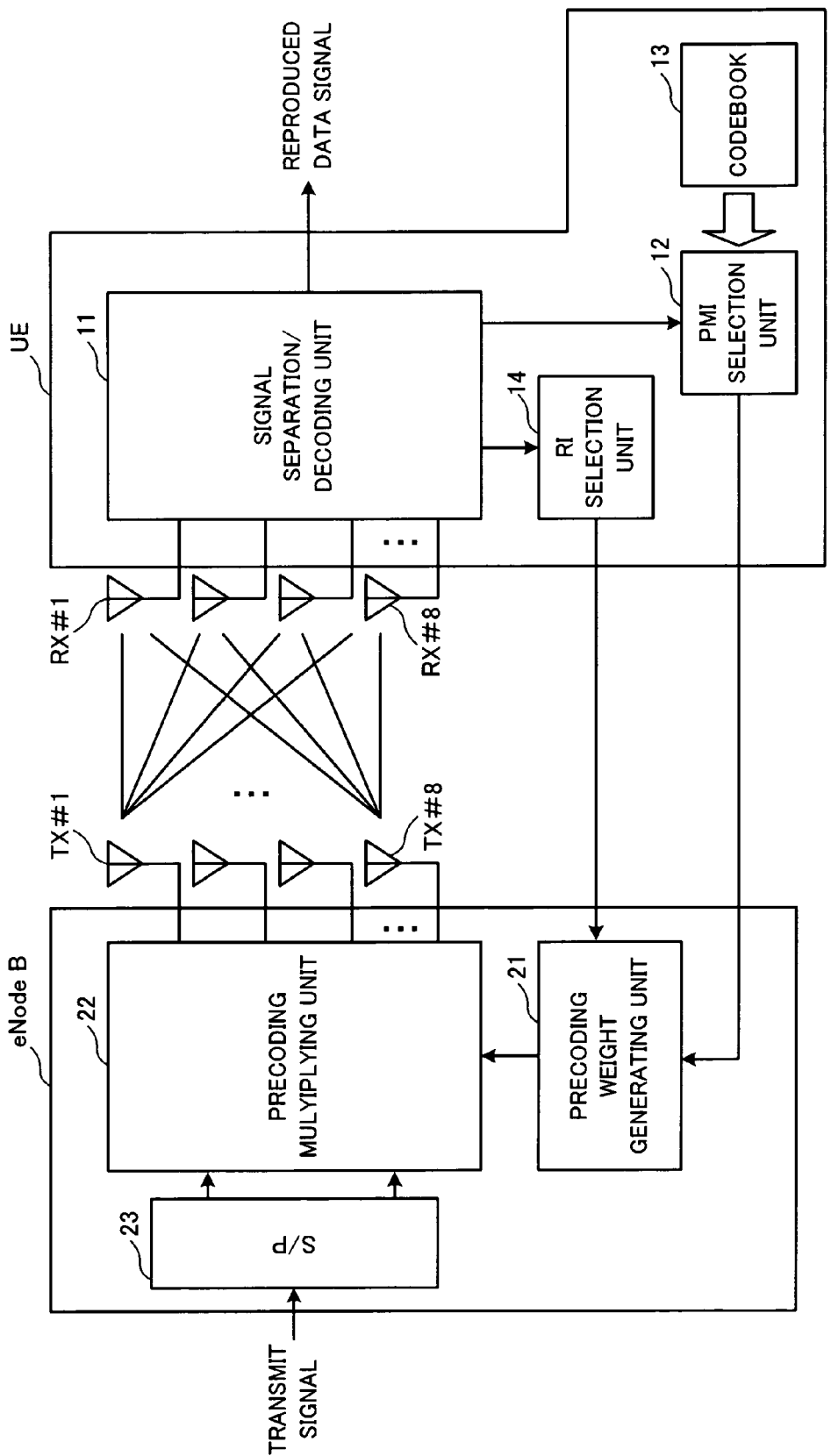
FIG. 1 is a conceptual diagram illustrating a MIMO system applied to a communication control method according to the present invention.

Hereinafter, embodiments of the present invention will be described in detail with reference to the accompanying drawings. First, a precoding on downlink MIMO transmission performed in an LTE-A system will be described based on the MIMO system of FIG. 1. FIG. 1 is a conceptual diagram illustrating a MIMO system employed in the communication control method according to the present invention. In addition, in the MIMO system of FIG. 1, each of the base station apparatus eNodeB and the user equipment UE has eight antennas.

In the precoding on downlink MIMO transmission in the MIMO system of FIG. 1, the user equipment UE measures a channel variation amount using the receive signals from each antenna and selects a precoding matrix indicator (PMI) and a rank indicator (RI) corresponding to the phase/amplitude control amount (precoding weight) having a maximum throughput (or maximum receive SINR) after synthesizing the transmit data from each transmit antenna of the base station apparatus eNodeB base on the measured channel variation amount. In addition, the selected PMI and RI are fed back to the base station apparatus eNodeB along with the channel quality indicator (CQI) in uplink. The base station apparatus eNodeB performs precoding for the transmit data based on the PMI and the RI fed back from the user equipment UE and transmits information from each antenna.

In the user equipment UE of FIG. 1, a signal separation/decoding unit 11 separates and decodes the control channel signal and the data channel signal contained in the receive signal received through the receive antennas RX#1 to RX#8. As the signal separation/decoding unit 11 performs the decoding process, the data channel signal for the user equipment UE is reproduced. The PMI selection unit 12 selects the PMI depending on the channel condition estimated by a channel estimation unit (not illustrated). In this case, the PMI selection unit 12 selects an optimal PMI from the codebook 13 including a plurality of existing precoding weights (e.g., N precoding weights) defined for each rank in both the user equipment UE and the base station apparatus eNodeB and the PMI corresponding to the precoding matrix. The RI selection unit 14 selects the RI depending on the channel condition estimated by the channel estimation unit. The PMI and the RI are transmitted to the base station apparatus eNodeB along with the channel quality indicator (CQI) as feedback information.

Meanwhile, in the base station apparatus eNodeB of FIG. 1, the precoding weight generating unit 21 generates the precoding weight based on the PMI and the RI fed back from the user equipment UE. The precoding multiplying unit 22 controls (shifts) the phase/amplitude for each transmit antenna TX#1 to TX#8 by multiplying the precoding weight by the transmit signal converted in parallel by the serial/parallel conversion unit (S/P) 23. As a result, the phase/amplitude-shifted transmit data are transmitted from the eight transmit antennas TX#1 to TX#8.

Figure 2:
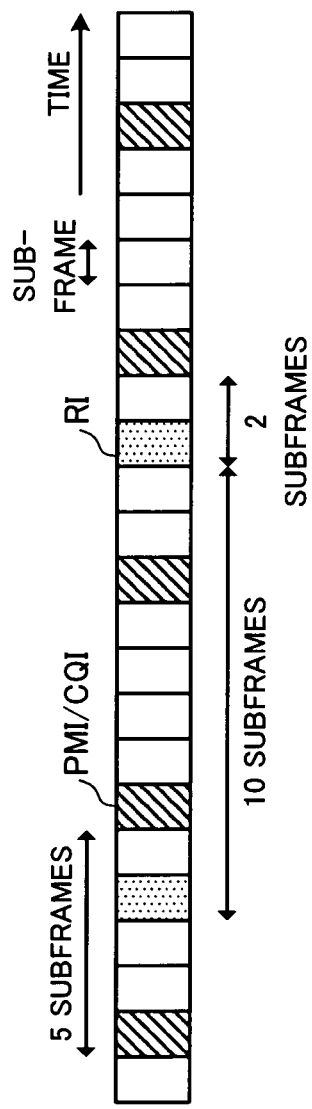
FIG. 2 is a diagram illustrating a feedback method of feedback information from the user equipment to the base station apparatus on downlink MIMO transmission.
Figure 3:
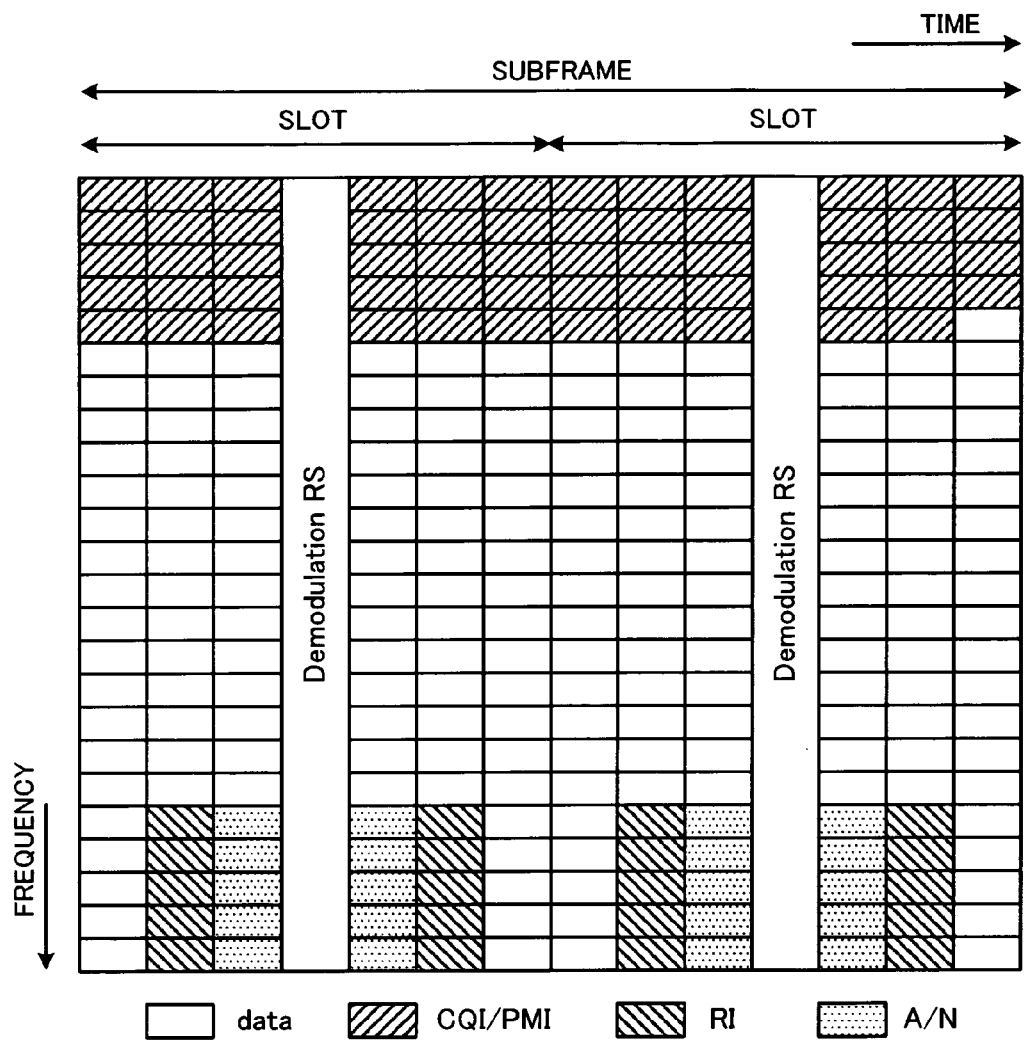
FIG. 3 is a diagram illustrating a feedback method of feedback information from the user equipment to the base station apparatus on downlink MIMO transmission.

Here, description will be made for a feedback method of feedback information including the channel information (PMI/CQI/RI) from the user equipment UE to the base station apparatus eNodeB on such downlink MIMO transmission. FIGS. 2 to 3 are diagrams illustrating a feedback method of feedback information from the user equipment UE to the base station apparatus eNodeB on downlink MIMO transmission. FIG. 2 illustrates a case where the feedback information is fed back periodically (hereinafter, referred to as periodic feedback), and FIG. 3 illustrates a case where the feedback information is fed back aperiodically (hereinafter, referred to as aperiodic feedback).

In the case of periodic feedback, the feedback information (such as PMI/CQI and RI) is fed back using a physical uplink control channel (PUCCH). As illustrated in FIG. 2, the PMI, the radio quality information in downlink (such as CQI: channel quality indicator), and the RI are fed back using different subframes (or different transmission time intervals (TTI)). In FIG. 2, a feedback mode of the channel information of PUCCH is set to mode 1-0(1-1), and the PMI/CQI period is set to 5 subframes. In addition, the RI period is set to twice the PMI/CQI period (10 subframes), and the subframe used to feed back the RI is offset from the subframe used to feed back the PMI/CQI by 2 subframes. In this case, PMI/CQI and RI are coded and fed back independently from each other.

Meanwhile, in aperiodic feedback, the feedback information (such as PMI/CQI and RI) is fed back using the physical uplink shared channel (PUSCH) in response to the uplink-granted trigger bit(s) coming from the base station apparatus eNodeB. As illustrated in FIG. 3, PMI/CQI and RI are fed back using different resource elements (RE) within the same subframe (TTI). In this case, similar to the periodic feedback, PMI/CQI and RI are coded and fed back independently from each other.

The PMI/CQI and the RI are coded independently from each other because the RI requires a receive quality higher than that of the PMI/CQI. That is, the RI is used to determine the number of streams at the time of MIMO transmission and requires a receive quality higher than that of the PMI/CQI used to determine the modulation and coding scheme (MCS) or the precoding weight. For this reason, the RI is coded with a coding rate lower than that of the PMI/CQI.

By the way, according to agreement of the LTE-A system, the upper limit of the number of overall streams (ranks) is set to 4, the maximum number of multiplexed streams per user equipment UE is set to 2, and the maximum number of multiplexed user equipments UE is set to 4 in downlink MU-MIMO on downlink MIMO transmission. That is, on downlink MU-MIMO transmission of the LTE-A system, a case where the number of multiplexed user equipments UE is set to 2, and the respective number of multiplexed streams is set to 2 can be supported. Alternatively, a case where the number of multiplexed user equipments UE is set to 4, and the respective number of multiplexed streams is set to 1 can be supported as well.

In the codebook used on this MIMO transmission, it is necessary to determine the precoding weight and the PMI in consideration of MU-MIMO transmission as well as SU-MIMO transmission for ranks 1 and 2. Meanwhile, since the number of streams is not equal to or greater than 3 in MU-MIMO transmission as described above, the precoding weight and the PMI optimized only for SU-MIMO transmission may be determined for rank 3 or higher without considering MU-MIMO transmission.

Figure 4:
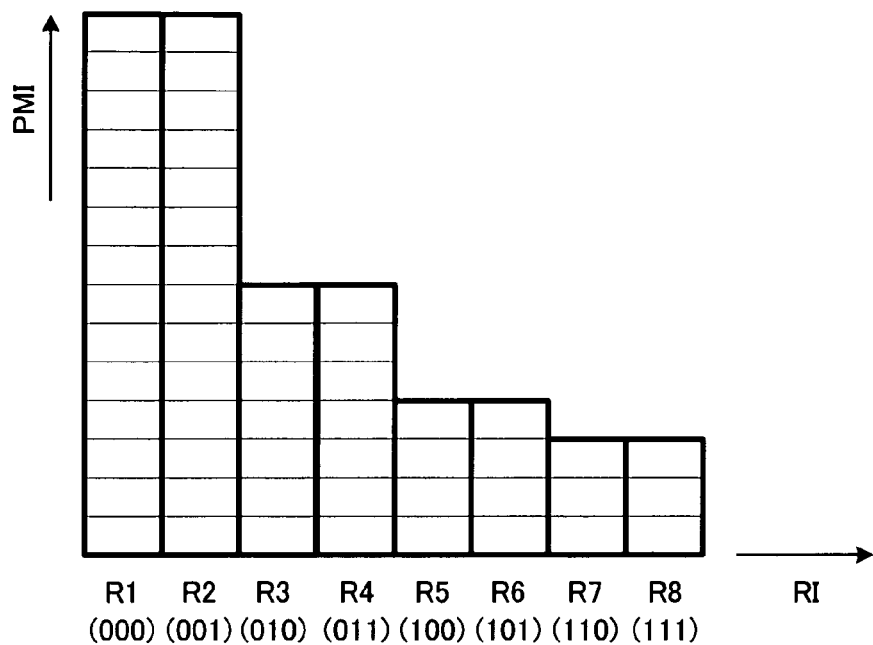
FIG. 4 is a schematic diagram illustrating a bit space for specifying a precoding weight for eight-antenna transmission.

In view of such circumstances, it is envisaged that the same number of PMIs of as that illustrated in FIG. 4 are set for each rank in the codebook corresponding to eight-antenna transmission. FIG. 4 is a schematic diagram illustrating a bit space for specifying the precoding weight corresponding to the eight-antenna transmission. As illustrated in FIG. 4, the bit space for specifying the precoding weight includes bits representing the RI (hereinafter, referred to as "RI bits") and bits representing the PMI (hereinafter, referred to as "PMI bits"). The size of the codebook corresponds to the number of PMIs as illustrated in FIG. 4. In addition, in FIG. 4, for convenient description purposes, the number of PMIs corresponding to ranks 1 and 2 is set to 14, the number of PMIs corresponding to ranks 3 and 4 is set to 7, the number of PMIs corresponding to ranks 5 and 6 is set to 4, and the number of PMIs corresponding to ranks 7 and 8 is set to 3. The numbers of PMIs corresponding to the ranks are just exemplary and are not intended to limit the invention.

As illustrated in FIG. 4, in the precoding weight corresponding to the eight-antenna transmission, unique RI bits are allocated to each rank, and the number of PMI bits is large in ranks 1 and 2, and the number of PMI bits is small in higher ranks. In the example of FIG. 4, four PMI bits and three RI bits are necessary for the ranks 1 and 2. For the RI bits, for example, "000" is allocated to the RI bits for indicating rank 1, and "111" is allocated to the RI bits for indicating rank 8. However, as illustrated in FIG. 4, when the bit space for specifying the precoding weight is provided, there is no precoding weight corresponding to the PMI bits in higher ranks (rank 3 or higher). Therefore, such PMI bits are not effectively utilized.

As described above, RI requires a higher receive quality compared to PMI/CQI and is coded with a high coding rate. Therefore, reduction of the number of RI bits is significantly meaningful in consideration of reduction of the information amount of the feedback information. The inventors achieve the invention by focusing on a fact that the PMI bits are not effectively utilized in the configuration of the codebook size illustrated in FIG. 4, and the amount of the feedback information is effectively reduced by reducing the number of RI bits.

In the communication control method according to the present invention, a control signal that specifies the precoding weight using the RI bits and the PMI bits is generated by allocating the same RI bits to a plurality of ranks equal to or higher than a predetermined rank in the bit space for specifying the precoding weight, and the control signal is fed back in uplink. According to this communication control method, since the same RI bits are allocated to a plurality of ranks equal to or higher than a predetermined rank, it is possible to reduce the number of the RI bits. Therefore, it is possible to reduce the amount of feedback information for specifying the precoding weight.

Figure 5:
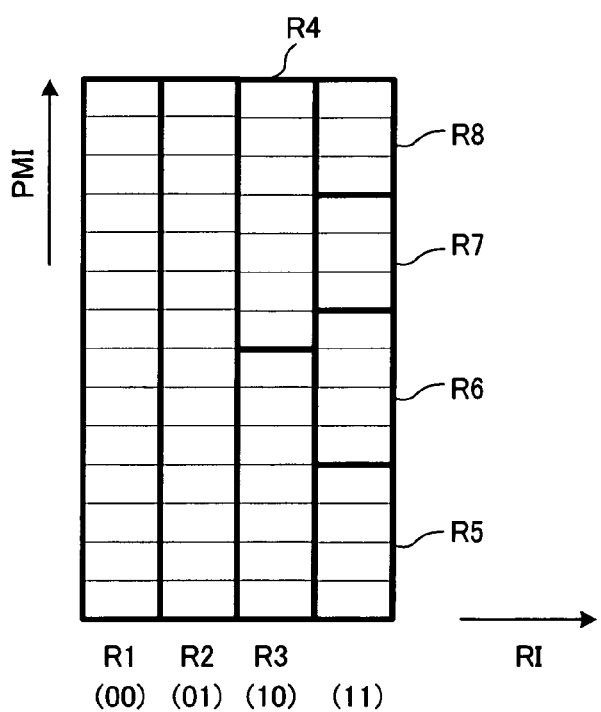
FIG. 5 is a schematic diagram illustrating a bit space for specifying a pre coding weight for eight-antenna transmission in a communication control method according to the present invention.

FIG. 5 is a schematic diagram illustrating the bit space for specifying the precoding weight on eight-antenna transmission in the communication control method according to the present invention. As illustrated in FIG. 5, in the bit space for specifying the precoding weight, the same RI bits are allocated to ranks equal to or higher than rank 3 (e.g., ranks 3 to 4, ranks 5 to 8). For example, "10" is allocated to the RI bits for indicating ranks 3 to 4, and "11" is allocated to the RI bits for indicating ranks 5 to 8. Meanwhile, unique RI bits "00" and "01" are allocated to the RI bits for indicating ranks 1 and 2, respectively.

In the bit space of FIG. 5, since the same RI bits are allocated to ranks 3 to 4, and the same RI bits are allocated to ranks 5 to 8, two bits are necessary for the RI bits corresponding to ranks 1 to 8. That is, in the bit space of FIG. 5, the number of RI bits corresponding to ranks 1 to 8 can be reduced by 1 bit, compared to the bit space of FIG. 4.

In addition, in the bit space of FIG. 5, a plurality of ranks are associated with the bit field of the RI bits ("10" or "11" described above) corresponding to ranks 3 or higher. For this reason, it is possible to avoid a problem that there is no precoding weight for the PMI bits in higher ranks (rank 3 or higher) as illustrated in the bit space of FIG. 4 and effectively utilize the PMI bits.

In particular, in the bit space of FIG. 5, a total number of PMI bits corresponding to the RI bits ("10" or "11" described above) allocated to a plurality of ranks (ranks 3 to 4 or ranks 5 to 8) is set to be equal to or smaller than a total number of PMI bits corresponding to the RI bits ("00" or "01" described above) allocated to a single rank (rank 1 or 2). As a result, even when the same bits are allocated to a plurality of ranks, it is possible to restrict the total number of PMI bits from exceeding the total number of PMI bits corresponding to the RI bits allocated to a single rank. Therefore, it is possible to reliably prevent the amount of feedback information from increasing as the number of PMI bits increases.

In addition, in the bit space of FIG. 5, since the same RI bits are allocated to a plurality of ranks equal to or higher than 3, it is possible to increase the number of precoding weights for ranks 1 and 2, compared to the number of precoding weights for ranks 3 or higher. Therefore, it is possible to effectively feed back the precoding weight (channel variation) on MU-MIMO transmission that requires high-precision channel information.

By the way, in an LTE system, when the rank (RI) is selected in the user equipment UE, it is necessary to select a common rank (RI) using the same communication band (for example, component carrier). In addition, when the PMI is selected in the user equipment UE, different PMIs may be selected in the unit of sub-band even in the same communication band.

In the communication control method according to the present invention, in the bit space for specifying the precoding weight, the same RI bits are allocated to a plurality of ranks equal to or higher than a predetermined rank. Therefore, different ranks may be selected when the PMI is selected in the unit of sub-band. For this reason, in the communication control method according to the present invention, in a case where the control signal for specifying the precoding weight is generated in the unit of sub-band within the same communication band, selection of the PMI bits corresponding to different ranks is restricted. As a result, it is possible to prevent different ranks from being selected when the PMI is selected in the unit of sub-band. Therefore, it is possible to feed back the feedback information without requiring a special process in a base station apparatus eNodeB complying with the LTE system specification.

For example, in the bit space of FIG. 5, in a case where PMI corresponding to rank 3 is selected, selection of the PMI bits corresponding to rank 3 is allowed when PMI is selected in the unit of sub-band. Meanwhile, selection of the PMI bits corresponding to rank 4 is restricted even when it is the PMI bits corresponding to the same RI bits. In this manner, it is possible to feed back the feedback information without requiring a special process in the base station apparatus eNodeB complying with the LTE system specification by applying a restriction depending on ranks when the PMI is selected in the unit of sub-band.

Hereinafter, embodiments of the present invention will be described in detail with reference to the accompanying drawings. Here, description will be made for a case where a base station apparatus and a mobile station apparatus complying with the LTE-A system specification are used.

Figure 6:
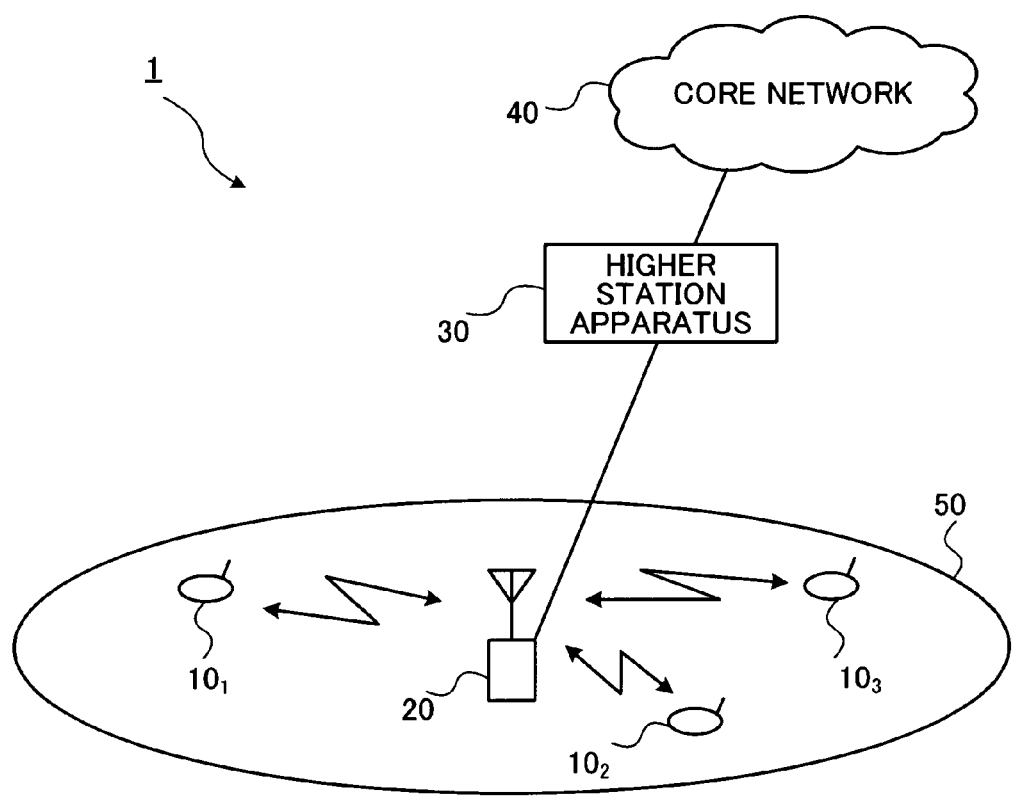
FIG. 6 is a diagram illustrating a configuration of the mobile communication system according to an embodiment of the present invention.

A mobile communication system 1 having a mobile station apparatus (UE) 10 and a base station apparatus (eNodeB) 20 according to an embodiment of the present invention will be described with reference to FIG. 6. FIG. 6 is a diagram illustrating a configuration of the mobile communication system 1 having the mobile station apparatus 10 and the base station apparatus 20 according to an embodiment of the present invention. The mobile communication system 1 of FIG. 6 is, for example, an LTE system or a system including SUPER 3G. In addition, the mobile communication system 1 may be called an IMT-Advanced or 4G.

As illustrated in FIG. 6, the mobile communication system 1 includes a base station apparatus 20 and a plurality of mobile station apparatuses 10 (including $10_1$, $10_2$, $10_3$, ..., and $10_n$, where n denotes an integer greater than 0) that communicate with the base station apparatus 20. The base station apparatus 20 is connected to an upper-layer station apparatus 30, which is connected to a core network 40. The mobile station apparatus 10 communicates with the base station apparatus 20 in a cell 50. The upper-layer station apparatus 30 may include, for example, but not limited to, an access gateway apparatus, a radio network controller (RNC), a mobility management entity (MME), and the like.

Since each mobile station apparatus $10_1$, $10_2$, $10_3$, ..., and $10_n$ has the same configuration, function and condition, the mobile station apparatus will be denoted by reference numeral 10 in the following description unless specified otherwise. For convenient description purposes, it is assumed that the mobile station apparatus 10 wirelessly communicates with the base station apparatus 20. However, more generally, the mobile station apparatus 10 may be called user equipment UE, including a fixed terminal apparatus as well as a mobile terminal apparatus.

As a radio access scheme in the mobile communication system 1, orthogonal frequency division multiple access (OFDMA) is employed in downlink, and single carrier frequency division multiple access (SC-FDMA) is employed in uplink. In OFDMA, a multiple carrier transmission scheme is employed, in which a frequency band is divided into a plurality of narrow frequency bands (subcarriers), and communication is performed by mapping data to each subcarrier. In SC-FDMA, a single carrier transmission scheme is employed, in which interference between terminals is alleviated by dividing a system band into bands including a single or a series of resource blocks for each terminal and causing a plurality of terminals to use different bands.

Here, description will be made for a communication channel in an LTE system. In downlink, the PDSCH shared by each mobile station apparatus 10 and the downlink L1/L2 control channels (PDCCH, PCFICH, and PHICH) are used. Using this PDSCH, user data, that is, a typical data signal is transmitted. The transmit data are included in this user data. In addition, CC allocated to the mobile station apparatus 10 from the base station apparatus 20 or scheduling information is notified to the mobile station apparatus 10 through the L1/L2 control channel.

In uplink, the physical uplink shared channel (PUSCH) shared and used by each mobile station apparatus 10 and the physical uplink control channel (PUCCH) as the uplink control channel are used. Using this PUSCH, user data are transmitted. In addition, using PUCCH, the downlink channel quality indicator (CQI) and the like are transmitted.

Figure 7:
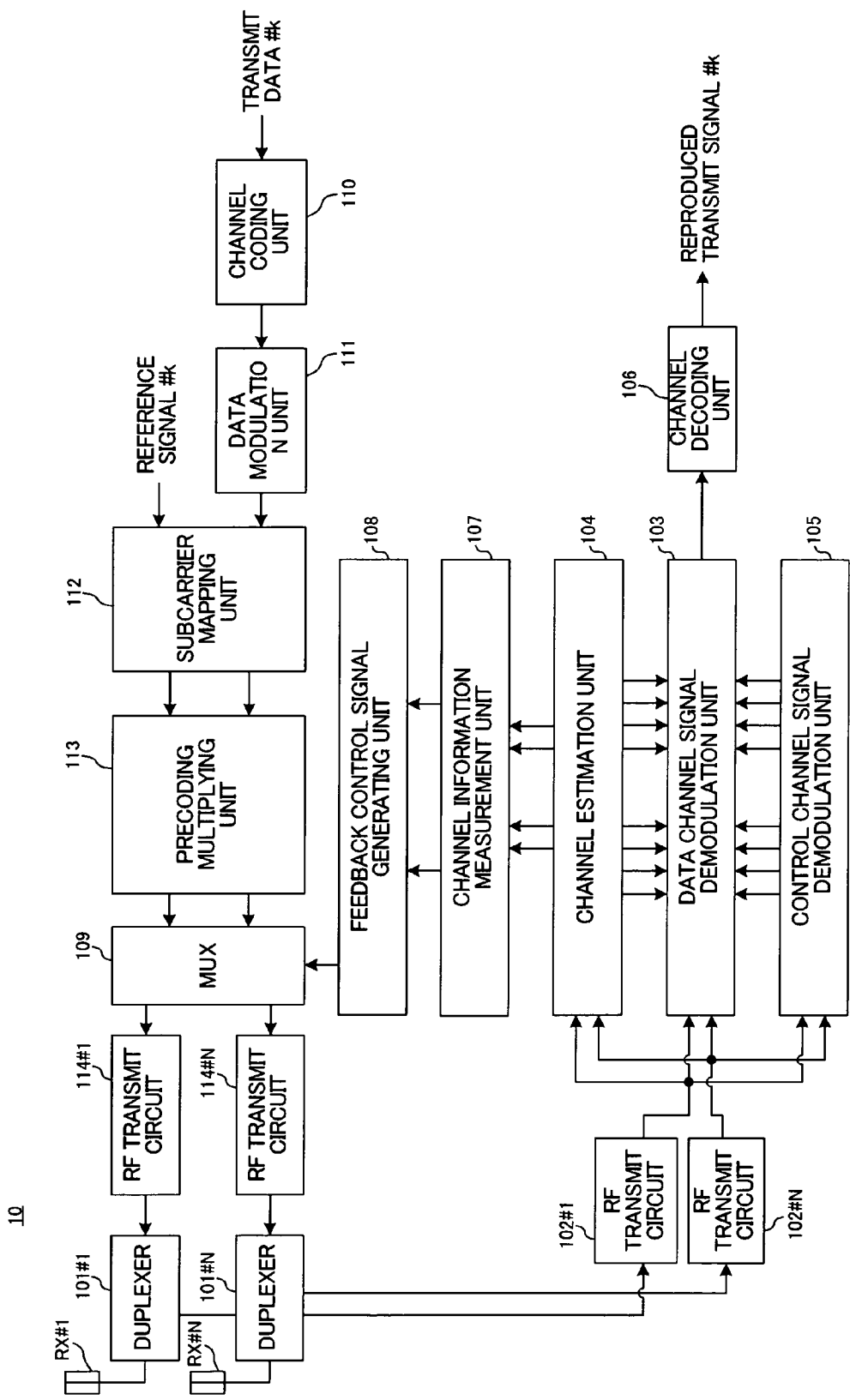
FIG. 7 is a block diagram illustrating a configuration of the mobile station apparatus according to the aforementioned embodiment.
Figure 8:
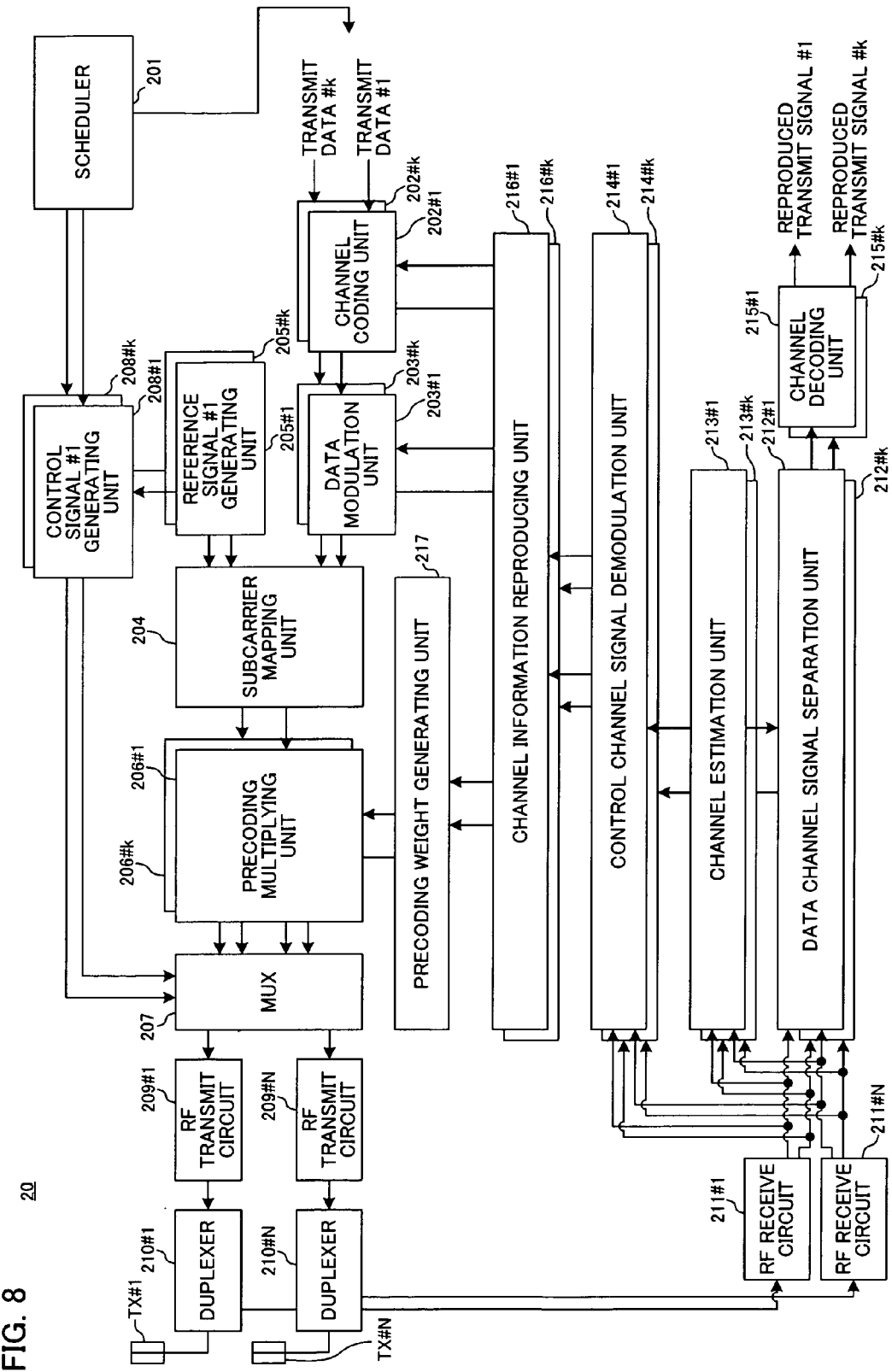
FIG. 8 is a block diagram illustrating a configuration of the base station apparatus according to the aforementioned embodiment.

FIG. 7 is a block diagram illustrating a configuration of the mobile station apparatus 10 according to the present embodiment. FIG. 8 is a block diagram illustrating a configuration of the base station apparatus 20 according to the present embodiment. The configurations of the mobile station apparatus 10 and the base station apparatus 20 of FIGS. 7 and 8 are simplified for description of the present invention, and it is assumed that they include elements of a typical base station apparatus and a typical mobile station apparatus, respectively.

In the mobile station apparatus 10 of FIG. 7, the transmit signal transmitted from the base station apparatus 20 is received by the antennas RX#1 to RX#N and is electrically divided by a duplexer 101#1 to 101#N into a transmit path and a receive path. Then, they are output to the RF receive circuits 102#1 to 102#N. In addition, the RF receive circuits 102#1 to 102#N perform a frequency conversion process for converting the radio frequency signal to a baseband signal. Then, a fast Fourier transform (FFT) unit (not illustrated) performs a Fourier transform to transform a time series signal to a frequency domain signal. The receive signal transformed to the frequency domain signal is output to the data channel signal demodulation unit 103.

The data channel signal demodulation unit 103 separates the receive signal input from the FFT unit, for example, using a maximum likelihood detection (MLD) signal separation technique. As a result, the receive signal coming from the base station apparatus 20 is separated into receive signals for user_#1 to user_#k, so that the receive signal for a user (here, referred to as a user k) of the mobile station apparatus 10 is detected. The channel estimation unit 104 estimates the channel condition from the reference signal included in the receive signal output from the FFT unit and notifies the data channel signal demodulation unit 103 and the channel information measurement unit 107 described below of the estimated channel condition. The data channel signal demodulation unit 103 separates the receive signal using the MLD signal separation technique based on the notified channel condition.

The control channel signal demodulation unit 105 demodulates the control channel signal (PDCCH) output from the FFT unit. In addition, the control information included in the control channel signal is notified to the data channel signal demodulation unit 103. The data channel signal demodulation unit 103 demodulates the detected receive signal for a user k based on the content notified from the control channel signal demodulation unit 105. In addition, before the demodulation process of the data channel signal demodulation unit 103, the detected receive signal for a user k is demapped by a subcarrier demapping unit (not illustrated) to recover the time series signal. The receive signal for a user k demodulated by the data channel signal demodulation unit 103 is output to the channel decoding unit 106. In addition, the channel decoding unit 106 performs the channel decoding process to reproduce the transmit_signal_#k.

The channel information measurement unit 107 measures the channel information based on the channel condition notified from the channel estimation unit 104. Specifically, the channel information measurement unit 107 measures the CQI based on the channel condition notified from the channel estimation unit 104 and selects the PMI and the RI depending on that. Then, they are notified to the feedback control signal generating unit 108.

The feedback control signal generating unit 108 serving as a control signal generating means generates a control signal (such as PUCCH) used to feed back the notified PMI, CQI, and RI to the base station apparatus 20. For example, the feedback control signal generating unit 108 selects the precoding weight for shifting the phase and/or amplitude for each antenna RX#1 to RX#N based on the notified PMI, CQI, and RI and specifies the precoding weight from the bit space of FIG. 5 using the RI bit and the PMI bit. In addition, the feedback control signal generating unit 108 generates a control signal for feeding back the RI bit and the PMI bit. The control signal generated by the feedback control signal generating unit 108 is output to the multiplexer (MUX) 109.

Meanwhile, the transmit_data_#k for user_#k transmitted from the upper layer are channel-coded by the channel coding unit 110 and then, the coded data are modulated by the data modulation unit 111. A discrete Fourier transform unit (not illustrated) performs inverse Fourier transform for the transmit_data_#k modulated by the data modulation unit 111 to transform the time series signal to the frequency domain signal, and the transformed signal is output to the subcarrier mapping unit 112.

The subcarrier mapping unit 112 performs mapping of the transmit_data_#k to the subcarriers based on the schedule information instructed from the base station apparatus 20. In this case, the subcarrier mapping unit 112 performs mapping (multiplexing) of the reference_signal_#k generated by a reference signal generating unit (not illustrated) along with the transmit_data_#k to the subcarriers. In this manner, the transmit_data_#k mapped to the subcarriers are output to the precoding multiplying unit 113.

The precoding multiplying unit 113 shifts the phase and/or amplitude of the transmit_data_#k for each receive antenna RX#1 to RX#N based on the precoding weight corresponding to the PMI selected by the channel information measurement unit 107. The transmit_data_#k of which the phase and/or amplitude have been shifted by the precoding multiplying unit 113 are output to the multiplexer (MUX) 109.

The multiplexer (MUX) 109 synthesizes the transmit_data_#k of which the phase and/or amplitude have been shifted and the control signal generated by the feedback control signal generating unit 108 to generate transmit signals for each receive antenna RX#1 to RX#N. The transmit signal generated by the multiplexer (MUX) 109 is subjected to the inverse fast Fourier transform in the inverse fast Fourier transform unit (not illustrated) to transform the frequency domain signal to the time domain signal, and then, the transformed signal is output to the RF transmit circuits 114#1 to 114#N. In addition, a frequency conversion process for converting the transformed signal to the radio frequency band is performed by the RF transmit circuits 114#1 to 114#N, and the converted radio frequency signal is output to the antennas RX#1 to RX#N through the duplexers 101#1 to 101#N and is transmitted from the receive antennas RX#1 to RX#N to the base station apparatus 20 in uplink. The RF transmit circuits 114#1 to 114#N, the duplexers 101#1 to 101#N, and the antennas RX#1 to RX#N constitute a transmission means for transmitting the control signal.

In this manner, in the mobile station apparatus 10 according to the present embodiment, the feedback control signal generating unit 108 specifies the precoding weight using the RI bit and the PMI bit from the bit space illustrated in FIG. 5. In this case, in the bit space used to specify the precoding weight, the same RI bits are allocated to a plurality of ranks equal to or higher than a predetermined rank. As a result, it is possible to reduce the number of RI bits. Therefore, it is possible to reduce the amount of feedback information to the base station apparatus 20 for specifying the precoding weight.

Meanwhile, in the base station apparatus 20 of FIG. 8, the scheduler 201 determines the number of multiplexed users (multiplexed user number) based on the channel estimation value provided from channel estimation units 213#1 to 213#k described below. In addition, the contents of resource allocation (scheduling information) in uplink and downlink for each user are determined, and the transmit_data_#1 to the transmit_data_#k for user_#1 to user_#k are transmitted to the corresponding channel coding units 202#1 to 202#k.

The transmit_data_#1 to the transmit_data_#k are channel-coded by the channel coding units 202#1 to 202#k and are output to the data modulation units 203#1 to 203#k for data modulation. In this case, channel coding and data modulation are performed based on a channel coding rate and a modulation scheme provided from channel information reproduction units 216#1 to 216#k described below. A discrete Fourier transform unit (not illustrated) performs inverse Fourier transform for the transmit_data_#1 to the transmit_data_#k modulated by the data modulation units 203#1 to 203#k to transform the time series signal to the frequency domain signal, and the transformed frequency domain signal is output to the subcarrier mapping unit 204.

The reference signal generating units 205#1 to 205#k generate individual reference signals (UE specific RS) for demodulating data channels for user_#1 to user_#k. The individual reference signals generated by the reference signal generating units 205#1 to 205#k are output to the subcarrier mapping unit 204.

The subcarrier mapping unit 204 performs mapping of the transmit_data_#1 to the transmit_data_#k to the subcarriers based on the schedule information provided from the scheduler 201. The transmit_data_#1 to the transmit_data_#k mapped to the subcarriers in this manner are output to the precoding multiplying units 206#1 to 206#k.

The precoding multiplying units 206#1 to 206#k shift the phase and/or amplitude of the transmit_data_#1 to the transmit_data_#k for each antenna TX#1 to TX#N (weighting of the antennas TX#1 to TX#N through the precoding) based on the precoding weight provided from the precoding weight generating unit 217 described below. The transmit_data_#1 to the transmit_data_#k of which the phase and/or amplitude are shifted by the precoding multiplying units 206#1 to 206#k are output to the multiplexer (MUX) 207.

The control signal generating units 208#1 to 208#k serving as a control signal generating means generates a control signal (PDCCH) based on the number of multiplexed users from the scheduler 201. Each PDCCH generated by the control signal generating units 208#1 to 208#k is output to the multiplexer (MUX) 207.

The multiplexer (MUX) 207 synthesizes the transmit_data_#1 to the transmit_data_#k of which the phase and/or amplitude are shifted and each PDCCH generated by the control signal generating units 208#1 to 208#k to generate transmit signals for each transmit antenna TX#1 to TX#N. The transmit signal generated by the multiplexer (MUX) 207 is subjected to the inverse fast Fourier transform in the inverse fast Fourier transform unit to transform the frequency domain signal to the time domain signal, and then, the transformed time domain signal is output to the RF transmit circuits 209#1 to 209#N. After the frequency conversion process for conversion to the radio frequency band in the RF transmit circuits 210#1 to 210#N, the signal is output to the transmit antennas TX#1 to TX#N through the duplexers 211#1 to 211#N. Then, the signal is transmitted from the antennas TX#1 to TX#N to the mobile station apparatus 10 in downlink.

Meanwhile, the transmit signal transmitted from the mobile station apparatus 10 in uplink is received by the antennas TX#1 to TX#N. The received signal is electrically divided into the transmit path and the receive path in the duplexers 210#1 to 210#N, and then, the divided signals are output to the RF receive circuits 211#1 to 211#N. In addition, the RF receive circuits 211#1 to 211#N perform a frequency conversion process for converting the radio frequency signal to the baseband signal. Then, Fourier transform is performed for the converted signal in the fast Fourier transform (FFT) unit (not illustrated) to transform the time series signal to the frequency domain signal. The receive signal transformed to the frequency domain signal is output to the data channel signal separation units 212#1 to 212#k. The antennas TX#1 to TX#N, the duplexers 210#1 to 210#N, and the RF receive circuits 211#1 to 211#N constitute a receive means for receiving the control signal.

The data channel signal separation unit 212#1 to 212#k separates the receive signal input from the FFT unit, for example, using a maximum likelihood detection (MLD) signal separation technique. As a result, the receive signal coming from the mobile station apparatus 10 is separated into receive signals for user_#1 to user_#k.

The channel estimation units 213#1 to 213#k estimate a channel condition based on the reference signal included in the receive signal output from the FFT unit and notifies the data channel signal separation units 212#1 to 212#k and the control channel signal demodulation units 214#1 to 214#k of the estimated channel condition. The data channel signal separation units 212#1 to 212#k separate the receive signal using the MLD signal separation technique described above based on the notified channel condition.

The receive signals for user_#1 to user_#k separated by the data channel signal separation units 212#1 to 212#k are demapped by a subcarrier demapping unit (not illustrated) to recover the time series signal. Then, the data are demodulated by a data demodulation unit (not illustrated). In addition, through the channel decoding process in the channel decoding units 215#1 to 215#k, the transmit_signal_#1 to the transmit_signal_#k are reproduced.

The control channel signal demodulation units 214#1 to 214#k demodulate the control channel signal (e.g., PDCCH) included in the receive signal input from the FFT unit. In this case, the control channel signal demodulation units 214#1 to 214#k demodulate the control channel signals corresponding to user_#1 to user_#k, respectively. In this case, the control channel signal demodulation units 214#1 to 214#k demodulate the control channel signal based on the channel condition notified from the channel estimation units 213#1 to 213#k. The control channel signals demodulated by the control channel signal demodulation units 214#1 to 214#k are output to the channel information reproduction units 216#1 to 216#k, respectively.

The channel information reproduction units 216#1 to 216#k reproduce information on the channels (channel information) from the information included in each control channel signal (e.g., PUCCH) input from the control channel signal demodulation units 214#1 to 214#k. The channel information includes feedback information such as CQI, PMI, and RI notified, for example, using PDCCH. In this case, the RI and the PMI are specified by the RI bit and the PMI bit, respectively, in the bit space of FIG. 5. The CQI reproduced by the channel information reproduction units 216#1 to 216#k is output to the data modulation units 203#1 to 203#k, respectively, and the channel coding units 202#1 to 202#k, respectively. The PMI and the RI reproduced by the channel information reproduction units 216#1 to 216#k are output to the precoding weight generating unit 217.

The precoding weight generating unit 217 serving as a weight generating means generates the precoding weight indicating the phase and/or amplitude shift amount for the transmit_data_#1 to the transmit_data_#k based on the PMI and the RI input from the channel information reproduction units 216#1 to 216#k. Each of the generated precoding weights is output to the precoding multiplying units 206#1 to 206#k and is used in the precoding of the transmit_data_#1 to the transmit_data_#k.

In this manner, the base station apparatus 20 according to the present embodiment receives the RI bit and the PMI bit in the bit space of FIG. 5 as feedback information for specifying the precoding weight from the mobile station apparatus 10. In this case, in the bit space including the RI bit and the PMI bit, the same RI bits are allocated to a plurality of ranks equal to or higher than a predetermined rank. As a result, it is possible to reduce the number of RI bits. Therefore, it is possible to reduce the amount of feedback information from the mobile station apparatus 10 for specifying the precoding weight.

As described above, in the communication control method according to the present embodiment, the control signal for specifying the precoding weight is generated using the RI bits and the PMI bits from the bit space, including a plurality of RI bits and a plurality of PMI bits, in which the same RI bits are allocated to a plurality of ranks equal to or higher than a predetermined rank, and this control signal is transmitted to the base station apparatus 20 in uplink. In this case, in the bit space for specifying the precoding weight, the same RI bits are allocated to a plurality of ranks equal to or higher than a predetermined rank. As a result, it is possible to reduce the number of RI bits. Therefore, it is possible to reduce the amount of feedback information for specifying the precoding weight.

While the present invention has been described in detail in conjunction with the aforementioned embodiments, those skilled in the art would appreciate that the embodiments described in this specification are not intended to limit the scope of the invention. The embodiments may be modified or changed without departing from the scope and spirit of the invention, as set forth in claims. Accordingly, description of this specification is provided for just exemplification purposes and is not intended to limit the invention.

For example, although the aforementioned embodiment has been described for a case where the same RI bits are allocated to a plurality of ranks equal to or higher than rank 3 in the bit space of FIG. 5, a target for allocating the same RI bits may be changed properly without limitation. For example, the same RI bits may be allocated to a plurality of ranks equal to or higher than any rank other than rank 3.

This application is based on and claims priority to Japanese Unexamined Patent Application No. 2010-087264, filed on Apr. 5, 2010, the entire content of which is incorporated herein by reference.

The invention claimed is:

1. A communication control method comprising:
   generating a control signal for specifying a precoding weight using bits representing a rank indicator (RI) and bits representing a precoding matrix indicator (PMI) from a bit space, including a plurality of bits representing the RI and a plurality of bits representing the PMI, wherein in said control signal the bits representing the RI are allocated to a plurality of ranks equal to or higher than a predetermined rank; and
   transmitting the control signal in an uplink.

2. The communication control method according to claim 1, wherein a total number of the bits representing the PMI corresponding to the same bits representing the RI allocated to a plurality of ranks is equal to or smaller than a total number of the bits representing the PMI corresponding to the bits representing the RI allocated to a single rank.

3. The communication control method according to claim 1, wherein the same bits representing the RI are allocated to a plurality of ranks equal to or higher than rank 3.

4. The communication control method according to claim 1, wherein selection of the bits representing the PMI corresponding to a different rank is restricted when the control signal for specifying the precoding weight is generated in the unit of sub-band within an identical communication band.

5. A mobile station apparatus comprising:
   a control signal generating means that generates a control signal for specifying a precoding weight using bits representing a rank indicator (RI) and bits representing a precoding matrix indicator (PMI) from a bit space, including a plurality of bits representing the RI and a plurality of bits representing the PMI, wherein in said control signal the bits representing the RI are allocated to a plurality of ranks equal to or higher than a predetermined rank; and
   a transmit means that transmits the control signal in an uplink.

6. A base station apparatus comprising:
   a receiving means that receives a control signal for specifying a precoding weight using bits representing a rank indicator (RI) and bits representing a precoding matrix indicator (PMI) from a bit space, including a plurality of bits representing the RI and a plurality of bits representing the PMI, wherein in said control signal the bits representing the RI are allocated to a plurality of ranks equal to or higher than a predetermined rank; and
   a weight generating means that generates a precoding weight based on the control signal.

\* \* \* \* \*